(No Model.)
R. M. PIERSON.
NUT FOR CARRIAGE AXLES.
No. 305,843. Patented Sept. 30, 1884.
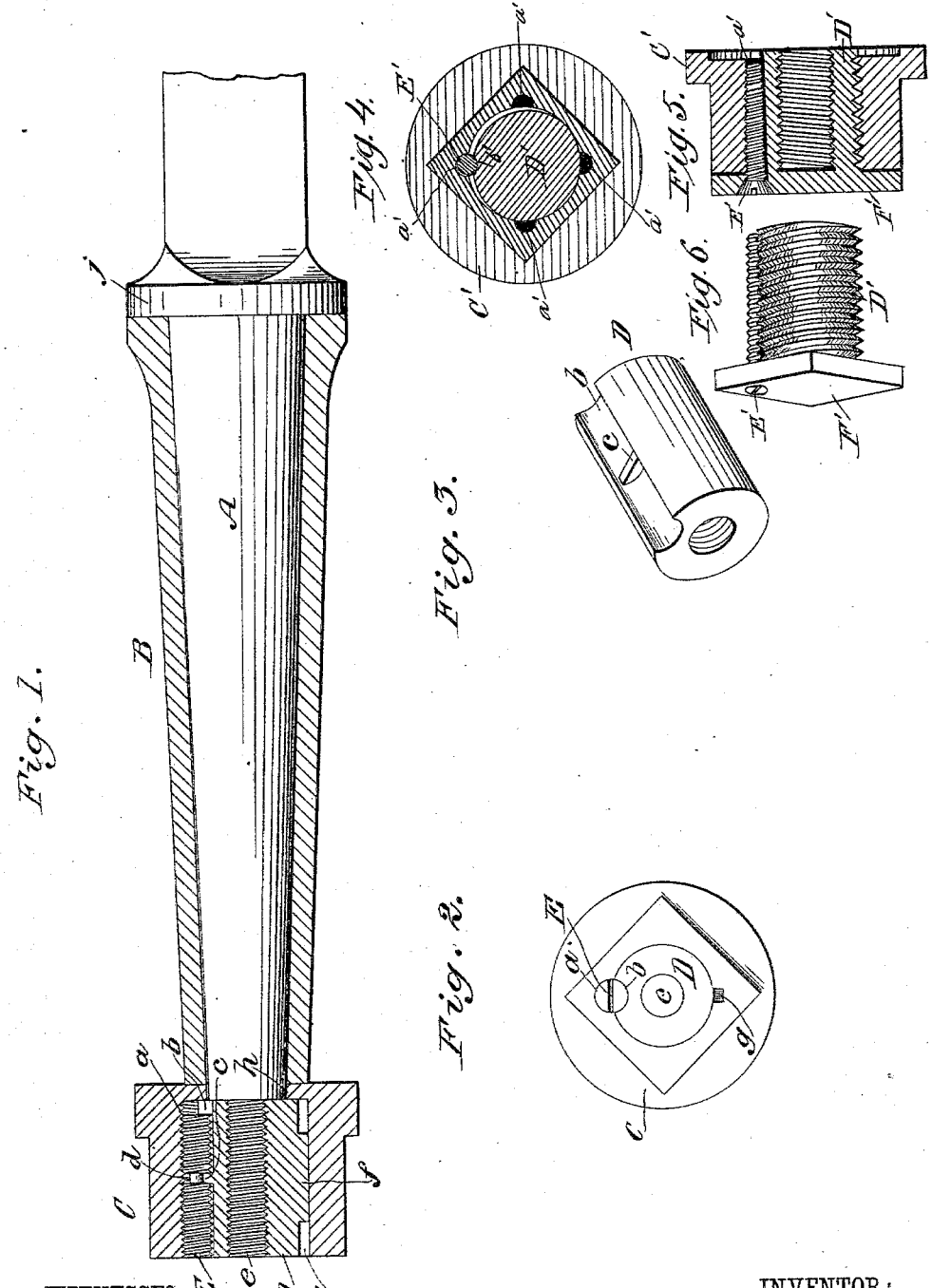
WITNESSES:
INVENTOR:
R. M. Pierson
BY Munn & Co
ATTORNEYS.
N. PETERS. Photo-Lithographer, Washington, D. C.

UNITED STATES PATENT OFFICE.

ROBERT MILLER PIERSON, OF MAYESVILLE, SOUTH CAROLINA.

NUT FOR CARRIAGE-AXLES.

SPECIFICATION forming part of Letters Patent No. 305,843, dated September 30, 1884.

Application filed January 18, 1884. (No model.)

*To all whom it may concern:*

Be it known that I, ROBERT M. PIERSON, a citizen of the United States, residing at Mayesville, in the county of Sumter and State of South Carolina, have invented certain new and useful Improvements in Nuts for Carriage-Axles, of which the following is a full, clear, and exact description.

This invention relates to hollow nuts, which are provided with adjustable cores for taking up the endwise wear of the axle-box in the hubs of carriage-wheels; and [the invention consists of the locking device for maintaining the hollow nut and core in any given relation to each other, as hereinafter described and claimed.

Reference is to be had to the accompanying drawings, forming part of this specification, in which similar letters of reference indicate corresponding parts in all the figures.

Figure 1 is a sectional elevation of an axle-box and axle having one form of my invention applied thereto. Fig. 2 is a front elevation of the same. Fig. 3 is a perspective view of the core D, removed from the hollow nut. Figs. 4 and 5 are longitudinal and cross sections showing another form of my invention, and Fig. 6 is a detail perspective view of part of the same.

A represents the axle; B, the axle-box; C, the hollow nut; D, the core fitted in the nut; and E represents the adjusting-screw placed in the circular recess formed by making the semicircular grooves $a\ b$ in the adjacent surfaces of the nut C and core D. The semicircular groove $a$ is screw-threaded to correspond with the screw-threads cut upon the adjusting-screw E, and the screw E is held from endwise movement by the transverse fin $c$, formed in the semicircular groove $b$, as shown in Fig. 3, which fin enters the circumferential groove $d$, made in the screw E, as shown in Fig. 1, so that by turning the screw E the nut C will be moved backward or forward upon the core D. The core D is internally screw-threaded, as shown, adapting it to be screwed upon the externally screw-threaded point $e$ of the axle A, for holding the wheel upon the axle, and for preventing all danger of the hollow nut C turning upon the core D; and for preventing the threads of the adjusting-screw E from being crushed or injured by use, I lock the nut C upon the core D by means of the feather $f$, formed upon the core D, said feather entering the groove $g$, formed in the inner surface of the hollow nut C, as will be understood from Figs. 1 and 2. The inner face of the hollow nut C is closed, except the central opening, $h$, which is of a size adapted to fit over the outer end of the journal portion of the axle A, so that the outer end of the axle-box B will run fairly against the hollow nut, as shown clearly in Fig. 1.

In use, so far as holding the wheel upon the axle is concerned, the nut C and core D act as one, and may be turned on and off from the point $e$ with a wrench, the same as an ordinary axle-nut; but when the axle-box B becomes worn at its ends from running in contact with the collar $j$ of the axle, and the inner surface of the hollow nut C, this wear may be taken up by turning the adjusting-screw E to the right, which will force the nut C forward upon the core D, so that by this adjustment the wheel may at all times be made to run snug and true.

Another form of my invention is shown in Figs. 4 and 5, in which an externally-threaded core, D', is screwed into the hollow nut C', and is locked in any given position therein by a screw, E', which is inserted into a threaded seat between said core and nut. This seat is formed by semi-cylindrical grooves $a'\ b'$, as in the above-described form of my invention, the groove $a'$ being threaded to enable the locking-screw E' to engage with the nut, and the hollow nut, instead of having but one semi-cylindrical groove for forming one-half of the seat, is provided with four such grooves, as shown at $a'$, in the four corners of said nut. With this construction the locking-key is to be entirely removed before adjusting the nut on the core, and a quarter of a revolution will be sufficient to make one of the grooves $a'$ register with the groove $b'$ to form a seat for the locking-screw.

The core D' is formed with a flange, F', at its outer end, which serves as a support for the screw E'.

Having thus described my invention, what I claim as new, and desire to secure by Letters Patent, is—

1. The combination, with a hollow carriage-axle nut and a core arranged therein, of a locking-screw seated longitudinally between said nut and core, substantially as shown and described.

2. The combination of a carriage-axle nut, a core arranged therein, a screw seated longitudinally between said nut and core, and means for supporting the screw in connection with the core, substantially as shown and described.

3. The hollow nut C, inclosing internally-screw-threaded core D, in combination with the adjusting-screw E, arranged for moving the nut upon the core, substantially as and for the purposes set forth.

4. The core D, grooved at $b$, and provided with the fin $c$, in combination with the screw E, formed with the groove $d$, and the hollow nut C, having the screw-threaded groove $a$, substantially as described.

5. The hollow nut C, inclosing the internally-screw-threaded core D, the nut and core being locked together by the feather $f$ and groove $g$, substantially as described.

ROBT. MILLER PIERSON.

Witnesses:
A. G. LYNE,
JAMES H. GRIDLEY.